(12) United States Patent
Fraas et al.

(10) Patent No.: US 7,027,438 B1
(45) Date of Patent: Apr. 11, 2006

(54) METHOD FOR DETERMINING A NETWORK ACCESS ADDRESS

(75) Inventors: Wolfgang Fraas, Wolfratshausen (DE); Klaus Hünlich, Neuching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/787,963

(22) PCT Filed: Sep. 1, 1999

(86) PCT No.: PCT/DE99/02736

§ 371 (c)(1),
(2), (4) Date: Mar. 23, 2001

(87) PCT Pub. No.: WO00/18178

PCT Pub. Date: Mar. 30, 2000

(30) Foreign Application Priority Data

Sep. 23, 1998  (DE) ................................ 198 43 626

(51) Int. Cl.
*H04L 12/28* (2006.01)

(52) U.S. Cl. .................................... 370/389; 370/395.1

(58) Field of Classification Search ................ 370/229, 370/360, 386, 389, 392, 393, 395.1, 396, 370/397, 399, 395.2, 395.31, 395.51, 395.54, 370/409, 400, 395, 3, 401

See application file for complete search history.

(56) References Cited

U.S. PATENT DOCUMENTS

| 5,119,369 | A | | 6/1992 | Tanabe et al. | |
|---|---|---|---|---|---|
| 5,568,475 | A | | 10/1996 | Doshi et al. | |
| 5,822,320 | A | * | 10/1998 | Horikawa et al. | 370/396 |
| 5,909,446 | A | * | 6/1999 | Horikawa et al. | 370/469 |
| 6,584,107 | B1 | * | 6/2003 | Hunlich | 370/395.53 |

FOREIGN PATENT DOCUMENTS

| DE | 43 26 795 A1 | 3/1994 |
|---|---|---|
| DE | 196 04 244 A1 | 8/1997 |

OTHER PUBLICATIONS

XP 000577242 Designing a Practical ATM LAN, Biagioni et al.

* cited by examiner

*Primary Examiner*—Brenda Pham
(74) *Attorney, Agent, or Firm*—Bell, Boyd & Lloyd LLC

(57) ABSTRACT

A method for determining a network access address wherein a terminal address and a system address designating the switching system associated with the communication terminal are stored in the communication terminal. When the communication terminal is connected to the communication network, a configuration message containing the terminal address is transmitted to the switching system determined by reference to the system address, which switching system determines the network access address via the configuration message.

7 Claims, 2 Drawing Sheets

METHOD FOR DETERMINING A NETWORK ACCESS ADDRESS

BACKGROUND OF THE INVENTION

The present invention relates to a method for determining a network access address for transmitting messages from a switching system to a communication terminal which is connected to the switching system via a communication network.

As a rule, the subscriber number allocated to a subscriber, e.g. the telephone number, or the fax number is established by the association of the communication terminal allocated to the subscriber with a switching system in communication landline networks.

The subscriber number (e.g., 636-82963) is composed of a part identifying the switching system (e.g., 636) and a part identifying the subscriber (e.g., 82963), the latter being determined by the subscriber interface of the switching system via which the communication terminal is connected to the switching system.

When the subscriber moves, the subscriber number allocated to the subscriber usually changes, in contrast to mobile radio networks, since the communication terminal is either allocated to another switching system or the communication terminal is connected to the same switching system via a different subscriber interface.

From German Offenlegungsschrift DE 196 04 244 A1, a communication system is known in which the communication terminals allocated to a switching system are connected to the switching system via an ATM-based communication network. In this arrangement, the subscriber interfaces are provided by a number of ATM hubs connected to the ATM-based network. The switching system and the ATM hub in each case have an ATM interface unit via which, on the one hand, a connection to the ATM-based network is implemented and, on the other hand, a bidirectional conversion between the internal data format of the switching system or the ATM hubs, respectively, and the ATM-based data format is effected.

In the cell-based data transmission method known as asynchronous transfer mode (ATM), fixed-length data packets, so-called ATM cells, are used for the data transport. An ATM cell is composed of a five-byte-long header containing switching data relevant to the transport of an ATM cell, and a forty-eight-byte-long payload.

Data transmission via an ATM-based network generally takes place in so-called virtual paths or virtual channels. For this purpose, interconnection tables with switching information consisting of a virtual channel identifier and of a virtual path identifier are set up in the respective ATM network nodes by an exchange of signaling information during a connection set-up before the beginning of the user data transmission. In the interconnection tables, a so-called VCI value is assigned to the virtual channel identifier and a so-called VPI value is assigned to the virtual path identifier. The switching information entered in the interconnection tables establishes how the virtual paths or, respectively, virtual channels contained in the virtual paths of the incoming and outgoing connections at the ATM network node are correlated with one another by the signaling; that is, which input is connected to which output by switching. ATM cells transmitted via these virtual connections have switching data essentially consisting of a VPI value and a VCI value in the header. The ATM header data is processed, i.e. the switching data arranged therein is detected and evaluated, at the input of an ATM network node. The ATM cells are then switched through by the ATM network node to an output representing a certain destination via the switching information stored in the interconnection table.

For addressing a subscriber interface of the ATM hub or a communication terminal connected to the subscriber interface via the ATM-based network via the switching system, an ATM channel is set up for each communication terminal between the ATM hub and the switching system, i.e. an unambiguous VPI/VCI address is allocated by the switching system to each subscriber interface of an ATM hub or, respectively, each communication terminal connected to a subscriber interface, for a data transmission. The VPI/VCI address has hitherto been allocated to the respective subscriber interfaces and administered manually in the switching system.

If the allocation of a communication terminal, allocated to the communication system, to a subscriber interface of an ATM hub is changed, i.e. because of a move, but the call number of the communication terminal is to be retained, a manual change of the VPI/VCI address allocated to the communication terminal is necessary in the switching system. However, this is very complex, especially in large communication systems.

The present invention is therefore directed to a method via which a network access address can be automatically allocated to a communication terminal in a simple manner.

SUMMARY OF THE INVENTION

Accordingly, the present invention offers an advantage in that, in contrast to the previous manual allocation method, the susceptibility of the system to errors is reduced by automatic allocation of a network access address to a communication terminal connected to the switching system via the communication network.

A further advantage of the present invention is that, among other things, access of unauthorized persons to the switching system is prevented by transmission of a personal identification number (PIN) and alternatively, or in addition, transmission of a password by a communication subscriber allocated to the communication terminal, frequently called subscriber authentication, for registering the terminal in the switching system.

Additional features and advantages of the present invention are described in, and will be apparent from, the following Detailed Description of the Invention and the Figures.

DETAILED DESCRIPTION OF THE INVENTION

Figure 1:
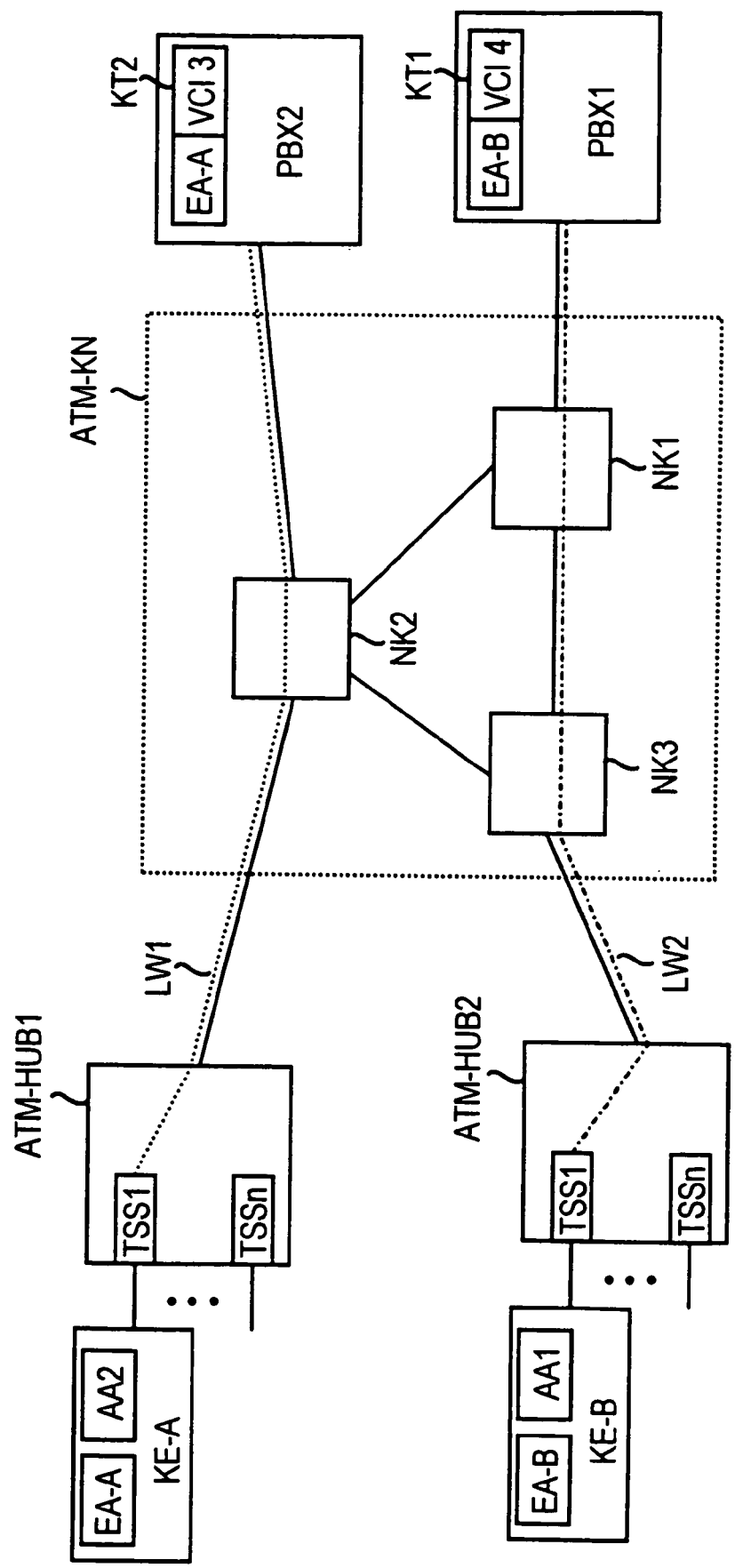
FIG. 1 shows a structural diagram for the diagrammatic representation of the essential functional units involved in the method according to the present invention, before a communication subscriber moves.

FIG. 1 shows a diagrammatic representation of two switching systems PBX1, PBX2 (Private Branch Exchange) which are connected to two ATM hubs ATM-HUB1, ATM-HUB2 via an ATM-based communication network ATM-KN. The ATM-based communication network ATM-KN consists, for example, of three network nodes NK1, NK2, NK3, the first switching system PBX1 being connected to the ATM based communication network ATM-KN via the first network node NK1, the second switching system PBX2 and the first ATM hub ATM-HUB1 being connected to the network via the second network node NK2 and the second ATM hub ATM-HUB2 being connected via the third network node NK3.

The ATM hubs ATM-HUB1, ATM-HUB2 in each case exhibit n subscriber interfaces TSS1, . . . , TSSn for connecting communication terminals to the ATM-based communication network ATM-KN. By way of example, a first communication terminal KE-A allocated to a first communication subscriber is connected via the subscriber interface TSS1 of the first ATM hub ATMHUB1, and a second communication terminal KE-B allocated to a second communication subscriber is connected via the subscriber interface TSS1 of the second ATM hub ATM-HUB2.

ISDN (Integrated Services Digital Network) communication terminals are usually connected to the ATM-based communication network-ATM-KN via $S_o$ interfaces or digital communication terminals are usually connected to the ATM-based communication network ATM-KN via interfaces derived therefrom, such as, for example, $U_{po}$ interfaces, via the ATM hubs ATM-HUB1, ATM-HUB2. In general, a $U_{po}$ or an $S_o$ interface includes, on the one hand, two user data channels which are equipped with a transmission rate of 64 kbit/s in each case as ISDN-oriented B channels and, on the other hand, a signaling channel which is configured as ISDN-oriented D channel with a transmission rate of 16 kbit/s. Furthermore, it is. generally possible to connect analog communication terminals to the ATM-based communication network ATM-KN via a/b interfaces.

These time slot-orientated data consisting of two B channels and one D channel are usually transmitted between the communication terminals KE-A, KE-B connected to the ATM hubs ATM-HUB1, ATM-HUB2 and the switching system on the basis of the data format IOM-2 known, for example, from the product document "ICs for Communications—IOM®-2 Interface Reference Guide" by Siemens, Munich, 3/91, order No. B115-H6397-X-X-7600, in particular pages 6 to 12. To transmit data via the ATM-based communication network ATM-KN, both the switching systems PBX1, PBX2 and the ATM hubs ATM HUB1, ATM-HUB2 in each case exhibit an ATM interface unit, not shown, via which, on the one hand, a connection to the ATM-based communication network ATM-KN is implemented and, on the other hand, a bidirectional conversion between the IOM-2 data format usually provided for data transmission between the switching systems PBX1, PBX2 and the ATM hubs ATM-HUB1, ATM-HUB2 and the ATM data format is effected.

A bidirectional conversion between the IOM-2 data format and the ATM data format can be done either in accordance with the method known from German Offenlegungsschrift DE 196 04 244 A1 or in accordance with the method proposed in the German patent application having the official reference number 198 39 129.3.

In the present exemplary embodiment, the first communication terminal KE-A is allocated to the second switching system PBX2 and the second communication terminal KE-B is allocated to the first switching system PBX1. In this connection, the literature frequently mentions that the first communication terminal KE-A is registered at the second switching system PBX2 and the second communication terminal KE-B is registered at the first switching system PBX1. For this purpose, the address of the second switching system PBX2, called system address AA2 in the further, text and an address unambiguously allocated to the first communication terminal KE-A in the ATM-based communication network ATM-KN, called terminal address EA-A in the further text, are stored in a memory of the first communication terminal KE-A. Furthermore, the address of the first switching system PBX1, called system address AA1 in the further text, and an address unambiguously allocated to the second communication terminal KE-B in the ATM-based communication network ATM-KN, called terminal address EA-B in the further, text are stored in a memory of the second communication terminal KE-B.

To transmit data from the second switching system PBX2 to the first communication terminal KE-A via the first route LW1,I the terminal address EA-A of the first communication terminal KE-A and a VPI/VCI address, called network access address VCI3 in the further text, are stored in a configuration table KT2 stored in the second switching system PBX2. The network access address VPI13 can be used for unambiguously addressing the first communication terminal KE-A in the ATM-based communication network ATM-KN. For transmitting data from the first switching system PBX1 to the second communication terminal KEB via the second route LW2, the terminal address EA-B of the second communication terminal KE-B and a network access address VCI4 allocated to this terminal address EA-B are stored in a configuration table KT1 stored in the first switching system PBX1. The network access address VPI4 can be used for unambiguously addressing the second communication terminal KE-B in the ATM-based communication network ATM-KN.

Figure 2:
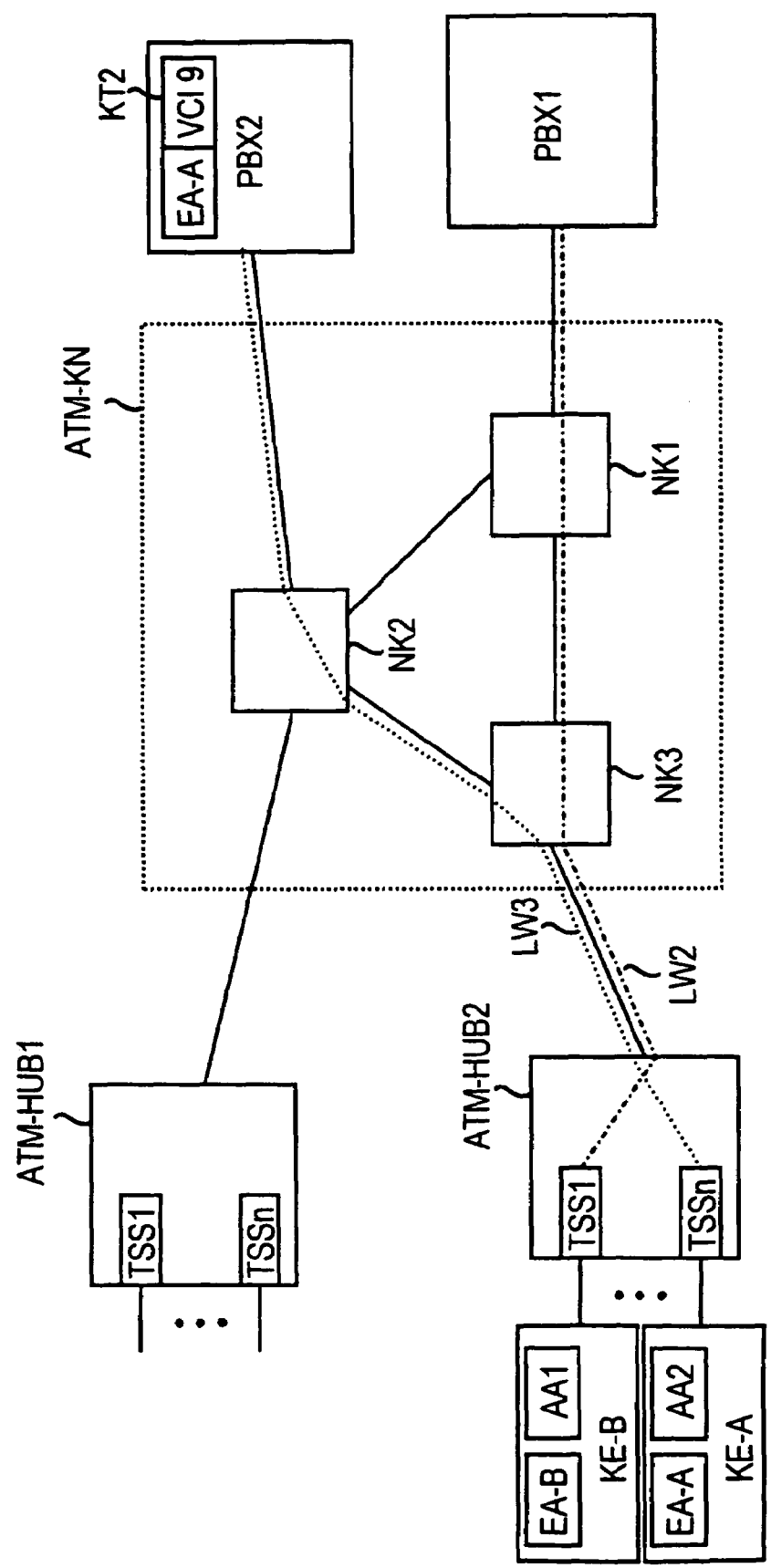
FIG. 2 shows a structural diagram for the diagrammatic representation of the essential functional units involved in the method according to the present invention, after the communication subscriber has moved.

FIG. 2 shows a diagrammatic representation of the allocation of the communication terminals KE-A, KE-B after a move by the first communication subscriber. Due to the move of the first communication subscriber, the allocation of the first communication terminal KE-A, allocated to the first communication subscriber, to the subscriber interfaces TSS1, . . . , TSSn of the ATM hub ATM-HUB1, ATM-HUB2 has changed. Thus, the first communication terminal KE-A is no longer connected to the ATM-based communication network ATM-KN via the subscriber interface TSS1 of the first ATM hub ATM-HUB1 but via the subscriber interface TSSn of the second ATM hub ATM-HUB2.

If the subscriber number hitherto allocated to the communication subscriber is to remain allocated to the communication subscriber even after the move, it is necessary that the network access address VPI3 for the first communication terminal KE-A, stored in the configuration table KT2 in the second switching system PBX2, is updated so that calls directed to the first communication subscriber by the second switching system PBX2 via the ATM-based communication network ATM-KN are forwarded to the subscriber interface TSSn of the second ATM hub ATM-HUB2.

For this purpose, the terminal address EA-A stored in the first communication terminal KE-A and the system addresses AA2 are transmitted from the first communication terminal KE-A to the second ATM hub ATM HUB2 when the first communication terminal KE-A allocated to the first communication subscriber is connected to the subscriber interface TSSn of the second ATM hub ATM-HUB2.

In a next step, the second ATM hub ATM-HUB2 sends a configuration message, containing the terminal address EA-A of the first communication terminal KE-A, via the third route LW3 to the second switching system PBX2 identified by the system address AA2 stored in the first communication terminal KE-A, frequently called home PBX of the first communication terminal KE-A in the literature. Using the transmitted configuration message and referring to the network nodes NK3, NK2 passed on the third route LW3, the second switching system PBX2 determines a new network access address VCI9, i.e. an ATM-based VPI/VCI address, for the first communication terminal KE-A and enters this address at the appropriate point in the configuration table KT2. The first communication terminal KE-A is thus considered to be newly registered at the second switching system PBX2.

In addition, it can be provided that the registration of the first communication terminal KE-A at the second switching system PBX2 is confirmed by the transmission of a personal identification number (PIN) and/or of a password by the first communication subscriber, frequently called subscriber authentication in the literature.

Although the present invention has been described with reference to specific embodiments, those of skill in the art will recognize that changes may be made thereto without departing from the spirit and scope of the invention as set forth in the hereafter appended claims.

The invention claimed is:

1. A method for determining a network access address for transmitting messages from a switch to a communication terminal, which is connected to the switch via a communication network, the method comprising the steps of:
   storing in the communication terminal both a terminal address individually allocated in the communication network and a system address designating the switch associated with the communication terminal;
   implementing subscriber interfaces for connecting the communication terminal to the communication network via hubs connected to the communication network;
   transmitting a configuration message containing the terminal address from a relevant hub to the switch when the communication terminal is being connected to a subscriber interface, wherein the configuration message contains the system address stored in the communication terminal; and
   determining the network access address via the configuration message.

2. A method for determining a network access address for transmitting messages from a switch to a communication terminal as claimed in claim 1, the method further comprising the step of:
   storing the network access address determined together with the terminal address in the switch wherein the communication terminal is considered to be registered at the switch.

3. A method for determining a network access address for transmitting messages from a switch to a communication terminal as claimed in claim 2, the method further comprising the step of:
   transmitting at least one of an identification number and a password to the switch from the communication terminal for registering the communication terminal at the switch.

4. A method for determining a network access address for transmitting messages from a switch to a communication terminal as claimed in claim 1, wherein, if the allocation of the communication terminal is changed from a first subscriber interface to a second subscriber interface, the network access address stored in the switch and allocated to the corresponding communication terminal is updated by the configuration message transmitted on connection to the second subscriber interface.

5. A method for determining a network access address for transmitting messages from a switch to a communication terminal as claimed in claim 1 wherein data transmission via the communication network is effected on Asynchronist Transfer Mode (ATM) data format.

6. A method for determining a network access address for transmitting messages from a switch to a communication terminal as claimed in claim 5, wherein the network address is an ATM-based virtual path identifier/virtual channel identifier VPI/VCI (VPI/VCI) address.

7. A method for determining a network access address for transmitting messages from a switch to a communication terminal as claimed in claim 6, wherein the VPI/VCI address includes both a VPI value and a VCI value.

* * * * *